Feb. 6, 1951 M. RONAYNE 2,540,459
VEHICLE WHEEL
Filed April 27, 1948 2 Sheets-Sheet 1

M. RONAYNE
INVENTOR.
BY E. C. McRae
J. R. Faulkner
T. H. Oster
ATTORNEYS

Feb. 6, 1951　　　　M. RONAYNE　　　　2,540,459
VEHICLE WHEEL
Filed April 27, 1948　　　　　　　　　　　2 Sheets-Sheet 2
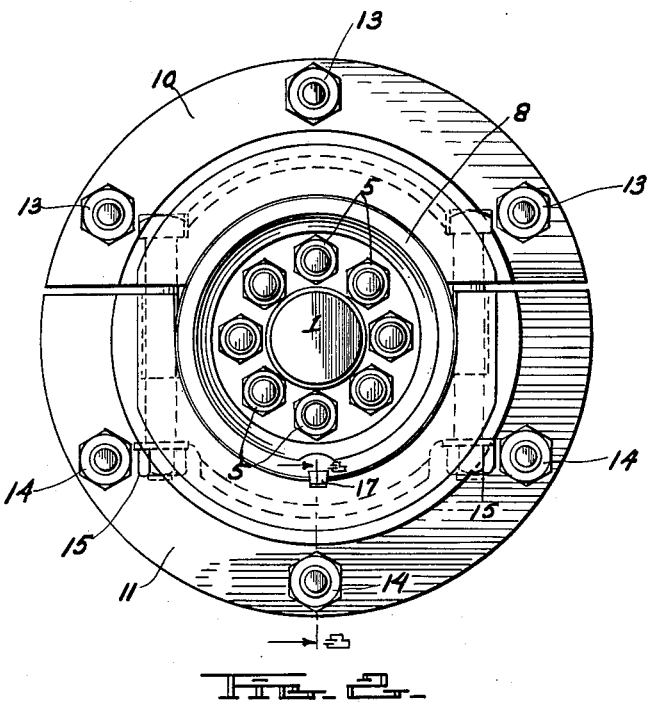
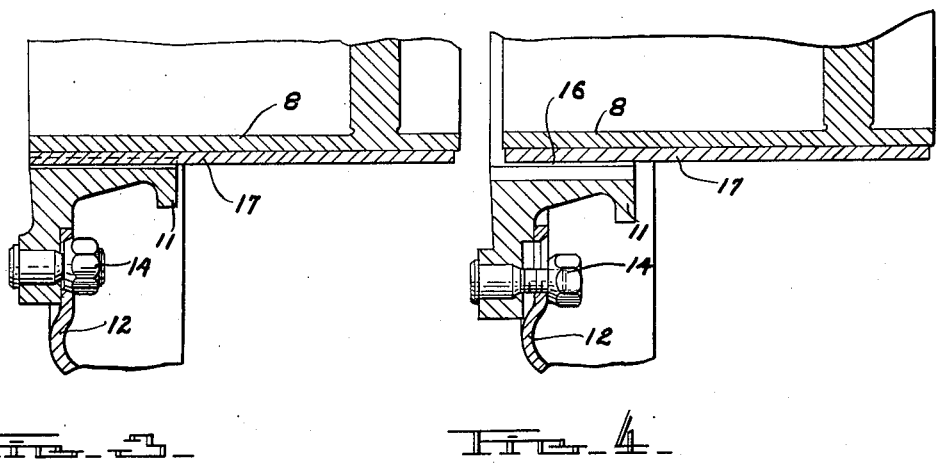
M. RONAYNE
INVENTOR.
BY E.C. McRae
J.L. Faulkner
G.H. Oster
ATTORNEYS Patented Feb. 6, 1951

2,540,459

UNITED STATES PATENT OFFICE 2,540,459

VEHICLE WHEEL

Michael Ronayne, Ilford, England, assignor to Ford Motor Company, Dearborn, Mich., a corporation of Delaware Application April 27, 1948, Serial No. 23,550
In Great Britain October 23, 1947

4 Claims. (Cl. 301—1)

This invention relates generally to vehicle wheels and has particular reference to an adjustable wheel and axle assembly for tractors and other vehicles.

An object of the present invention is to provide an adjustable wheel and axle assembly by means of which the wheel tread of a vehicle can be easily altered. In tractors particularly it is extremely advisable to provide means for varying the tread to permit cultivating and other operations to be performed upon row crops. The embodiment of the invention shown comprises an adjustable wheel and axle assembly including a drum mounted on the axle and having locating means thereon, and a two-part hub for securing the wheel to the drum, the two parts of the hub being adjustably secured together by clamping means so arranged as to permit the wheel to be moved axially along the drum from one locating position to another. In a preferred arrangement, the locating means comprises a plurality of spaced grooves or notches on the drum surface, and the clamping means for securing the two parts of the hub together comprises one or more bolts or like members which are so arranged as to engage with one of said grooves or notches so as to lock the hub in a predetermined position against axial or endwise movement.

The invention will be more completely understood from the following detailed description which is given in conjunction with the accompanying drawings, in which:

Figure 2 is an end view of the construction shown in Figure 1, with the wheel removed from the hub.

Figure 3 is a cross sectional view on the line 3—3 of Figure 2.

Figure 4 is a cross sectional view similar to Figure 3 but showing the lower part of the hub in its lowered position after the clamping bolts have been slackened.

Figure 1:
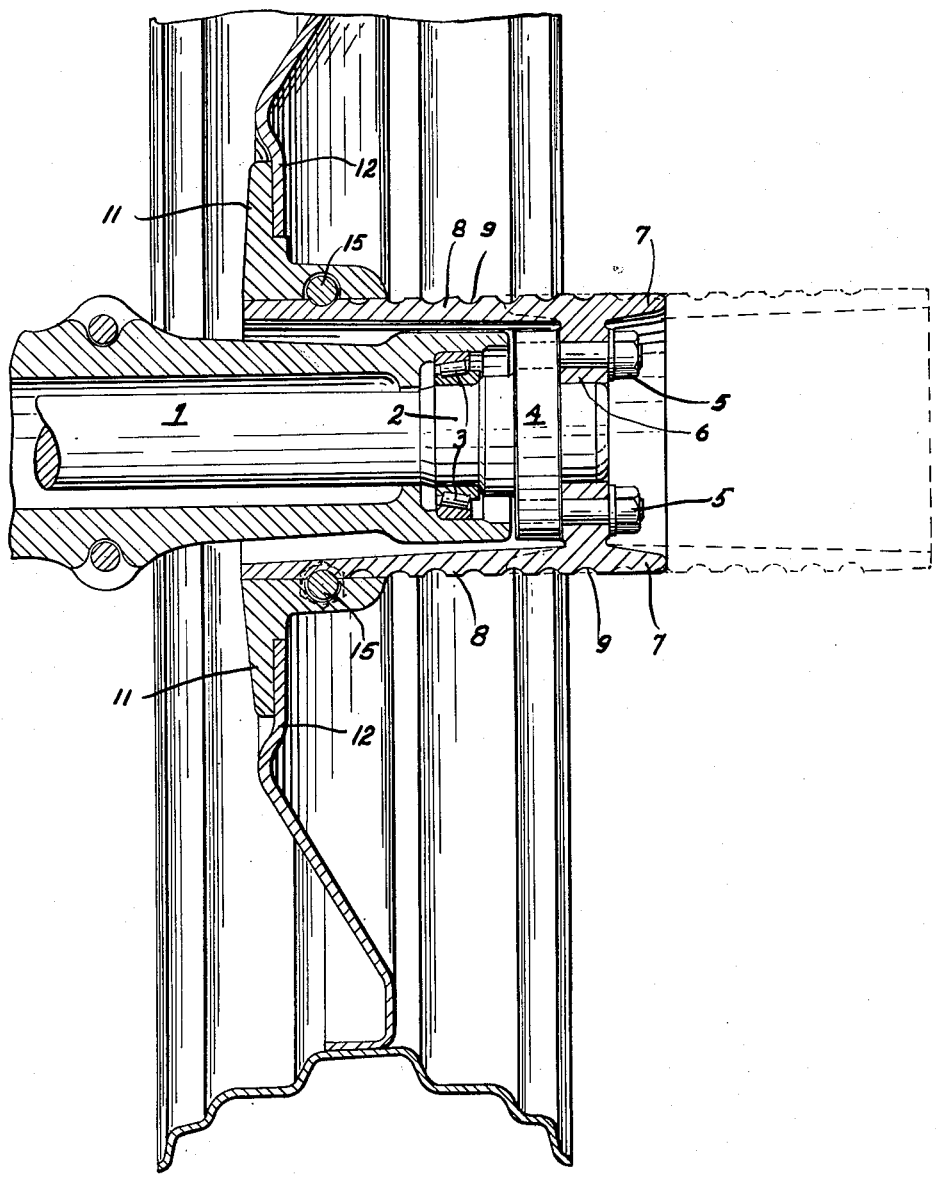
Figure 1 is a horizontal cross sectional view through the wheel hub and axle assembly of the present invention.

Referring now to the drawings, the reference character 1 indicates the rear axle of a tractor, the outer end portion of this axle having an enlargement 2 upon which the roller bearings 3 are seated, and a flange 4 to which is secured by means of bolts 5 the partition 6 formed near one end of a cylindrically shaped drum 8. It will be noted that the partition or mounting flange 6 is located considerably nearer the outer end 7 of the drum than its inner end to permit the drum to be reversed upon the axle to provide a plurality of adjustments, as will be described more in detail hereinafter. The drum 8 provides a support for the wheel hub and is formed along its periphery with a series of axially spaced annular locating grooves 9.

The wheel hub is formed in two parts, 10 and 11, the upper part 10 being secured to the wheel flange 12 by three bolts 13, and the lower half 11 being secured to the wheel flange 12 by three bolts 14. The drum 8 is keyed to the lower part 11 of the wheel hub by a driving key 17 which extends the full length of the drum 8 and is welded at both ends to the latter, as shown in Figure 3. The upper and lower parts 10 and 11 respectively of the wheel hub are secured together by two clamping bolts 15 which are so positioned as to engage with one of the grooves 9 in the drum 8, so as to give a positive axial location to the wheel assembly, the particular groove chosen depending upon the wheel tread desired. For example, the drum 8 and grooves 9 may be arranged so that tread adjustment from say 52" to 66" may be obtained with the drum 8 mounted as shown in full lines in Figure 1. If a wider tread is desired, the drum may be reversed end-for-end and the mounting flange 6 of the drum bolted to the axle with the major part of the drum extending axially outwardly therefrom, as shown in dotted lines in Figure 1, resulting in a mounting which permits the tread to be increased in predetermined increments to, for example, say 80".

In order to adjust the wheel upon the axle so as to increase or decrease the wheel tread, the wheel is first lifted clear of the ground by any suitable means, whereupon the two clamping bolts 15 are withdrawn and the three wheel flange bolt nuts 14 are slackened off sufficiently to enable the lower part 11 of the wheel hub to drop clear of the drum 8 as shown in Figure 4, the weight of the wheel being taken on the drum 8 by the upper part 10 of the wheel hub. This provides a sufficient clearance 16 between the wheel hub and the drum to permit the wheel to be moved axially along the drum to a new position determined by another of the grooves 9, the latter co-operating with the clamping bolts 15 when the latter are tightened so as to again lock the wheel hub against axial or endwise movement.

Although I have shown and described certain embodiments of the invention, it will be understood that I do not wish to be limited to the exact construction shown and described, but that various changes and modifications may be made

What is claimed is:

1. An adjustable wheel and axle assembly comprising an axle having a flange thereon, a drum having a mounting flange located near one end of said drum, removable bolts securing the mounting flange of said hub to said axle flange, a pair of co-operating hub parts encircling said drum, said hub parts having radially extending flanges supporting said wheel, a series of bolts securing each of said hub parts to said wheel, means permitting adjustment of said hub parts relative to each other to enable said hub parts to be separated to permit movement of said hub parts axially along said drum, and a pair of clamping bolts each engaging both of said hub parts and each also engaging one of the grooves in said drum to clamp said hub parts to said drum in selected axial positions, said drum being reversible to increase the number of available locating positions for said wheel on said axle.

2. An adjustable wheel and axle assembly comprising an axle, a drum mounted on said axle and having spaced locating means thereon, a wheel, a hub for said wheel having two relatively movable parts, and clamping means adjustably securing the two parts of said hub together to permit the hub to be moved axially along said drum from one locating position to another, said locating means comprising a plurality of axially spaced grooves on the drum surface and said clamping means comprising a bolt arranged to engage one of said grooves to lock the hub against axial movement in a position determined by the groove selected.

3. An adjustable wheel and axle assembly comprising a drum mounted upon said axle and having a plurality of axially spaced peripheral grooves formed therein, a pair of cooperating hub parts encircling said drum and having radially extending flanges supporting said wheel, a plurality of bolts securing each of said hub parts to said wheel, and a pair of clamping bolts each engaging each of said hub parts and each also engaging one of the grooves in said drum to clamp said hub parts to said drum in selected axial positions, said bolts being removable from said hub parts to enable said hub parts to be separated and to permit movement of said hub parts axially along said drum.

4. An adjustable wheel and axle assembly comprising a drum mounted upon said axle and having a plurality of axially spaced peripheral grooves formed therein, a pair of separable hub parts each encircling a portion of the periphery of said drum and cooperating with each other to completely encircle said drum, a plurality of bolts carried by each hub part and extending axially outwardly therefrom, said wheel having a corresponding number of holes therein for receiving said bolts with the holes being sufficiently large to provide clearance around the shank of said bolts, nuts upon said bolts for clamping the wheel upon said hub parts, aligned parallel apertures through said hub parts on opposite sides of the axle, and a pair of clamping bolts extending through the apertures in said hub parts and each also engaging one of the grooves in said drum to clamp said hub parts to said drum in selected axial positions, said clamping bolts being removable from said hub parts to enable said hub parts to be separated and moved axially along said drum when the nuts on the bolts carried by the hub parts are loosened.

MICHAEL RONAYNE.

REFERENCES CITED

The following references are of record in the file of this patent:

UNITED STATES PATENTS

| Number | Name | Date |
| --- | --- | --- |
| 2,123,533 | Johnston | July 12, 1938 |
| 2,458,249 | Bunting | Jan. 4, 1949 |

FOREIGN PATENTS

| Number | Country | Date |
| --- | --- | --- |
| 412,691 | Great Britain | July 5, 1934 |